United States Patent
Nebel

(10) Patent No.: US 8,505,578 B2
(45) Date of Patent: Aug. 13, 2013

(54) ACTUATOR FOR CONTROLLING A FLUID FLOW

(75) Inventor: Eugen Nebel, Nidderau-Windecken (DE)

(73) Assignee: Samson AG, Frankfurt am Main (DE)

( * ) Notice: Subject to any disclaimer, the term of this patent is extended or adjusted under 35 U.S.C. 154(b) by 217 days.

(21) Appl. No.: 13/160,480

(22) Filed: Jun. 14, 2011

(65) Prior Publication Data

US 2012/0085948 A1  Apr. 12, 2012

(30) Foreign Application Priority Data

Aug. 16, 2010 (DE) .......................... 10 2010 037 011

(51) Int. Cl.
*F16K 3/26* (2006.01)

(52) U.S. Cl.
USPC .................... 137/625.38; 251/51

(58) Field of Classification Search
USPC .............. 137/625.3, 625.33, 625.37, 625.38, 137/601.13; 251/48, 50, 51, 52, 53, 55
See application file for complete search history.

(56) References Cited

U.S. PATENT DOCUMENTS

| | | | | |
|---|---|---|---|---|
| 2,384,627 A | * | 9/1945 | Krone et al. | 251/50 |
| 2,710,736 A | * | 6/1955 | Miller | 251/51 |
| 3,990,475 A | * | 11/1976 | Myers | 137/625.38 |
| 4,397,331 A | * | 8/1983 | Medlar | 137/625.38 |
| 4,978,102 A | * | 12/1990 | Schuchart et al. | 137/625.37 |

FOREIGN PATENT DOCUMENTS

| | | |
|---|---|---|
| DE | 1991290 U | 8/1968 |
| DE | 7932013 U1 | 4/1980 |

OTHER PUBLICATIONS

German Patent and Trademark Office, German Examination Report, Report date Nov. 15, 2012, pp. 1-10, Application Serial No. 102010037011.8 which was filed Aug. 16, 2010, Applicant: Samson AG, Munich, Germany.
German Patent and Trademark Office, Translation of German Examination Report, Report date Nov. 15, 2012, pp. 1-3, Application Serial No. 102010037011.8 which was filed Aug. 16, 2010, Applicant: Samson AG.

* cited by examiner

*Primary Examiner* — Eric Keasel
(74) *Attorney, Agent, or Firm* — Woodling, Krost and Rust

(57) ABSTRACT

The invention relates to an actuator (10) for controlling a fluid flow which comprises a valve housing (11), a flow restrictor (18) and a valve seat (16), in which the flow restrictor (18) is designed such that the flow restrictor (18)—together with a closure (22) which is connected to the valve housing (12)—will form a pressure-relieving chamber (28), and as a result, a relative movement of the flow restrictor (18) and the chamber closure (22) together with the actuation will cause the volume of the pressure-relieving chamber (28) to change as a function of the direction of movement, and the flow restrictor (18) has a recess (24) which will allow the fluid to be controlled to flow into the pressure-relieving chamber (28). The invention is characterized in that the seal (26, 30) between the flow restrictor (18) and the valve housing (11) is designed such that, in the closing position, with the flow restrictor (18) resting tightly on the valve seat (16), the seal (26, 30) will have a sealing effect, and with the flow restrictor (18) not resting on the seat, the seal (26, 30) will allow a defined amount of fluid from the pressure-relieving chamber (28) to pass through.

12 Claims, 2 Drawing Sheets

ACTUATOR FOR CONTROLLING A FLUID FLOW

Figure 1:
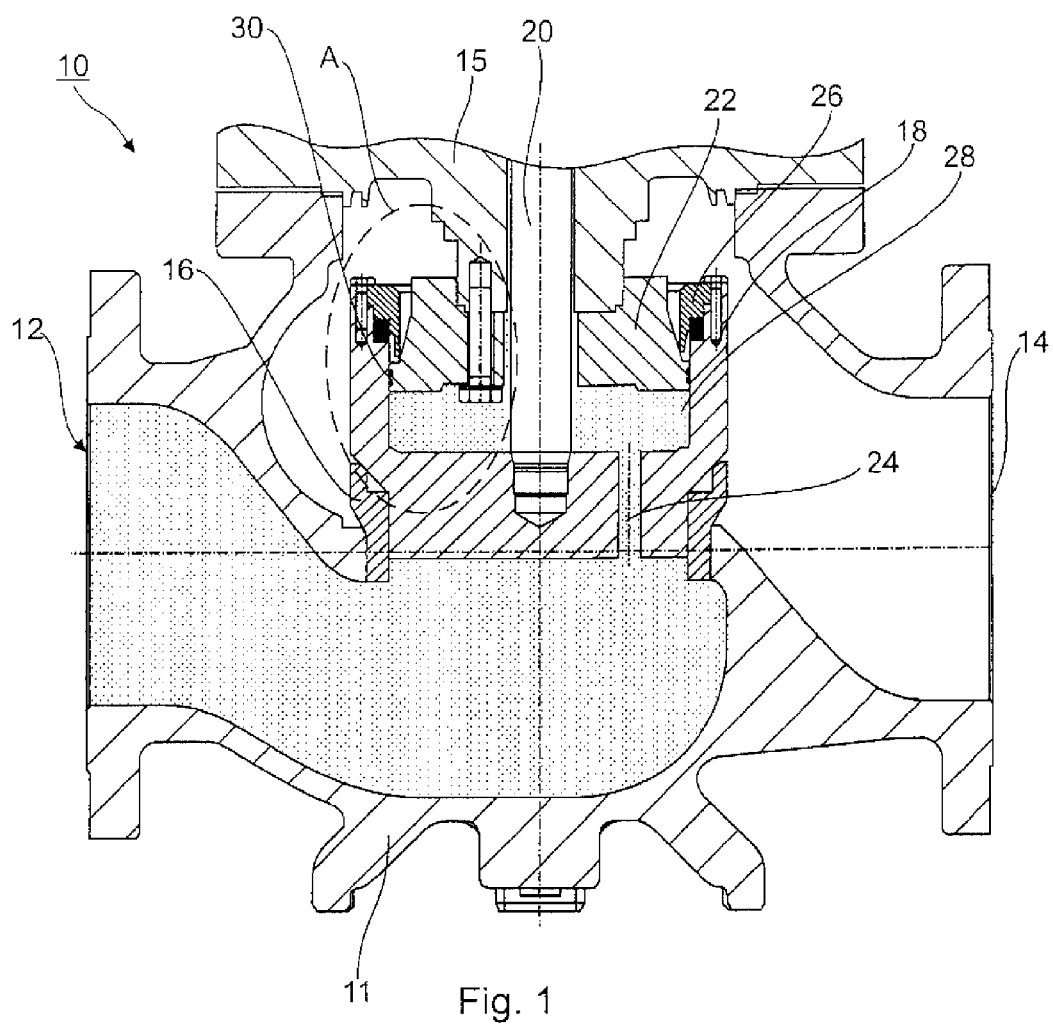

The invention relates to an actuator for controlling a fluid flow.

In process engineering, actuators are used for restricting or also for shutting off fluid flows. These actuators include a valve through which the fluid flow will pass. Such actuator valve cooperates with an actuating drive which in turn moves a flow restrictor located within the valve. The valve has an inlet and an outlet. Situated between the inlet and the outlet is the flow restrictor which is used for adjusting the fluid flow. In the case of valves for high flow rates or for high differential pressures, vast forces will unilaterally act on the flow restrictor in the flow direction. For this reason, a high actuating power will be required to counter the forces acting on the flow restrictor.

For pressure relief, a chamber will be formed between the flow restrictor and the valve housing on the outlet side. To be more precise, a chamber will be formed above the flow restrictor by the flow restrictor together with a closure which is connected to the valve housing. A passage connects this chamber to the inlet side of the flow restrictor which is preferably the pressurized side of the flow restrictor. Owing to this passage, almost identical pressure prevails on either side of the flow restrictor—which reduces the actuating power required for moving the flow restrictor.

According to the prior art, the chamber is sealed between the chamber closure connected to the valve housing and the flow restrictor. This prevents any adverse effects on the controlled fluid flow due to leakage flows through the flow restrictor. However, such seal will result in increased friction when the flow restrictor moves relative to the chamber closure. Consequently, more power will be required for actuating the flow restrictor. Moreover, above all in the case of media with adherent solid particles, a high degree of wear in the area of the seal must be anticipated.

In order to avoid such shortcomings, double cone systems have been used in the prior art. However, their disadvantage is that manufacturing them requires a lot of design effort. For this design, for example, two valve cones need to be accommodated within a valve, which makes the housing geometry rather complex. Moreover, such a system will also clearly be more complex to control since the required incident flow to the rear of a cone will result in instability.

It is the object of the present invention to provide an actuator for controlling a fluid flow which includes a low-friction flow restrictor with low wear.

In accordance with the invention, an actuator for controlling a fluid flow including a pressure relief comprises a valve housing, a valve body and a valve seat. The valve housing has an outlet and an inlet. Disposed between said inlet and said outlet is the valve seat on which a flow restrictor abuts in a closing position thereof. Depending on the position of the flow restrictor, there will be a respective fluid flow through the valve. The flow restrictor thus has an inlet side and an outlet side. Moreover, a chamber is provided on the side facing away from the inlet side of the flow restrictor for pressure relief of the actuator. This chamber is formed by boundary walls on the side of the flow restrictor and on the side of the valve housing. The chamber walls on the side of the flow restrictor and on the side of the valve are movably mounted relative to each other. The volume of the pressure relief chamber will change depending on the position of the flow restrictor. On the inlet side, the flow restrictor has a recess, in particular in the form of a passage, which allows the fluid to be controlled to flow into the pressure relief chamber.

According to the invention, a seal is provided between the chamber boundary on the side of the housing, a chamber closure, and the chamber boundary on the side of the flow restrictor. The seal has been designed such that it will only seal the outlet side of the pressure relief chamber when the flow restrictor is in its closing position. A flow restrictor is in its closing position when it prevents the fluid to be controlled from flowing through the valve. The other open positions of the flow restrictor will allow a defined passage of the fluid from the pressure relief chamber into the outlet side portion of the valve.

This is particularly advantageous in that, in fully or partially open positions, a defined amount of fluid flow from the pressure relief chamber, i.e. a defined amount of leakage through the flow restrictor, may surprisingly be tolerated. As a result, the sealing requirements can be reduced to such an extent that the pressure relief chamber really only needs to be sealed in a static operating condition, i.e. in a closed position. As a result, the seals for the operating condition of open positions may be reduced and thus no major friction forces will occur during the valve adjustment—which clearly reduces wear and the power required for the adjustment.

In a first advantageous embodiment, there is basically a defined gap between the chamber wall on the valve housing side and the chamber wall on the flow restrictor side. This is advantageous since an annular gap will not cause any friction and thus will not be susceptible to wear and tear either. The gap is, in particular, dimensioned such that the flow rate toward the outlet side will be considerably lower than the chamber inlet flow through the passage within the flow restrictor. In the closed position, the wall on the side of the valve housing will be sealed from the wall on the side of the flow restrictor, for example by means of a valve seat.

In a further embodiment, a seat ring may be provided which is mounted on the flow restrictor and, together with the flow restrictor, will encompass the chamber closure on the valve housing side in an axial direction. As a result, once the flow restrictor is moved into the closing position, this will cause the seat ring to be pressed onto the chamber closure on the valve housing side from the outside, thus sealing the pressure relief chamber.

Depending on the inlet/outlet ratio of the pressure relief chamber which is predetermined by the inlet-side passage within the flow restrictor and the defined gap, a pressure may advantageously build within the pressure relief chamber which will be some 5% to 7% lower than the pressure prevailing on the inlet side of the valve. This pressure ratio will be obtained when the flow restrictor is in its open position.

In yet another advantageous embodiment, the actual flow rate may be considerably smaller than the maximum adjustment ratio i.e. the size of the adjustable range in relation to the maximum flow rate. Preferably the actual flow rate will be less than 2% of the maximum flow rate.

According to the invention, the pressure relief chamber is designed such that a cylindrical wall is provided on the side of the flow restrictor. This cylindrical wall is delimited in a lid-like manner by a closure on the side of the valve housing. An annular gap is provided between the cylindrical wall on the flow restrictor side and the boundary on the valve housing side which is circular in cross-section, in the axial direction, the cylindrical wall encompasses the lid on the valve housing side. As a result, when the valve is closed, the flow restrictor housing and the valve housing will be pressed onto each other in an axial direction, thus sealing the pressure relief chamber. However, when the flow restrictor is moved into an open position, axial displacement of the flow restrictor relative to the valve housing will cause a gap to form between the lid on the valve housing side and the axial encompassment on the flow restrictor side. As there is an additional a gap in the radial direction between the flow restrictor and the lid, fluid may now pass through the flow restrictor in an open position thereof from the valve inlet to the valve outlet. In a closed position of the flow restrictor, any passage of the fluid will be prevented by the above described embodiment. Consequently, this will completely shut off any fluid flow through the valve. In the open position, this embodiment will allow movement of the flow restrictor in a pressure-relieved manner, and there will be no friction and thus no wear owing to the gap between the valve housing and the flow restrictor wall. In the open position, the actual flow through the flow restrictor will be negligible. This embodiment constitutes a particularly simple design of the actuator according to the invention.

In yet another embodiment, the seat of the flow restrictor exhibits a flexible sealing edge. Besides the above mentioned advantages, this additionally allows manufacturing tolerances of the flow restrictor to be compensated.

In a particularly advantageous embodiment, the chamber wall on the flow restrictor side may be cylindrical. The boundary of the chamber on the valve housing side is formed by a cone which is flattened at its ends. The cylinder wall on the flow restrictor side encompasses the flattened sides of the cone in an axial direction. The conical design of the cover on the valve housing side has the advantage that a seat ring mounted on the flow restrictor will also press resiliently and radially against the lateral slopes of the conical closure, thus allowing to compensate for manufacturing tolerances and ensuring reliable sealing of the chamber when the valve is in its closed position.

In a closed position, the required sealing of the pressure relief chamber is thus accomplished by the provision of a corresponding seat ring. The seat ring may in particular be mounted on the flow restrictor side.

Further advantages, features and possible applications of the present invention will become obvious from the following description in combination with the embodiments illustrated in the drawings.

The terms and associated reference numerals contained in the list below have been used throughout the description, the claims and the drawings. In the drawings, FIG. 1 is a sectional view of a valve housing according to the invention, and FIG. 2 is a detailed view A of the flow restrictor seal of FIG. 1.

Shown in FIG. 1 is a valve 10 having an inlet side 12 and an outlet side 14. In this case, the inlet side of the valve 10 receives a fluid flow. The inlet and outlet sides are connected via a valve seat 16. This valve seat can be closed by means of a flow restrictor 18. Moreover, a valve rod 20 connects the flow restrictor 18 to a drive (not shown). The axial movement of said valve rod 20 is used to control the volume flow through the valve 10. In order to ensure pressure-relieved movement of the flow restrictor 18, the outlet side 14 of the flow restrictor 18 is provided in the form of a hollow cylinder. Engaging with this hollow cylinder is a conical closure 22. In this manner, a pressure-relieving chamber 28 is formed between the conical closure 22 and the flow restrictor 18. The pressure relief is accomplished in that a passage 24 is provided in the flow incident surface of said flow restrictor 18 which allows said fluid to flow into the pressure-relieving chamber 28. As a result, the pressure conditions are almost identical both on the inlet and on the outlet side of the actuator, thus allowing a pressure-relieved movement of the flow restrictor 18.

Resting on said hollow cylindrical flow restrictor wall 18 is a seat ring 26 which is smaller in cross-section than the internal diameter of the hollow cylinder. This seat ring 26 will thus restrict the travel path of the flow restrictor 18 in the direction of the valve seat 16. However, the travel path of the flow restrictor 18 has been designed such that exactly when the latter abuts on the valve seat 16, the seat ring 26 will at the same time seal the outlet side portion of the valve 10 with respect to the pressure relief chamber 28. In the radial dimension, a gap is provided between the cylinder wall of the flow restrictor 18 and the conical closure 22. This gap will allow a defined flow through it in an unclosed position of the flow restrictor 18. This will on the one hand significantly reduce friction, while on the other hand the fluid passing through will not interfere with the process.

Figure 2:
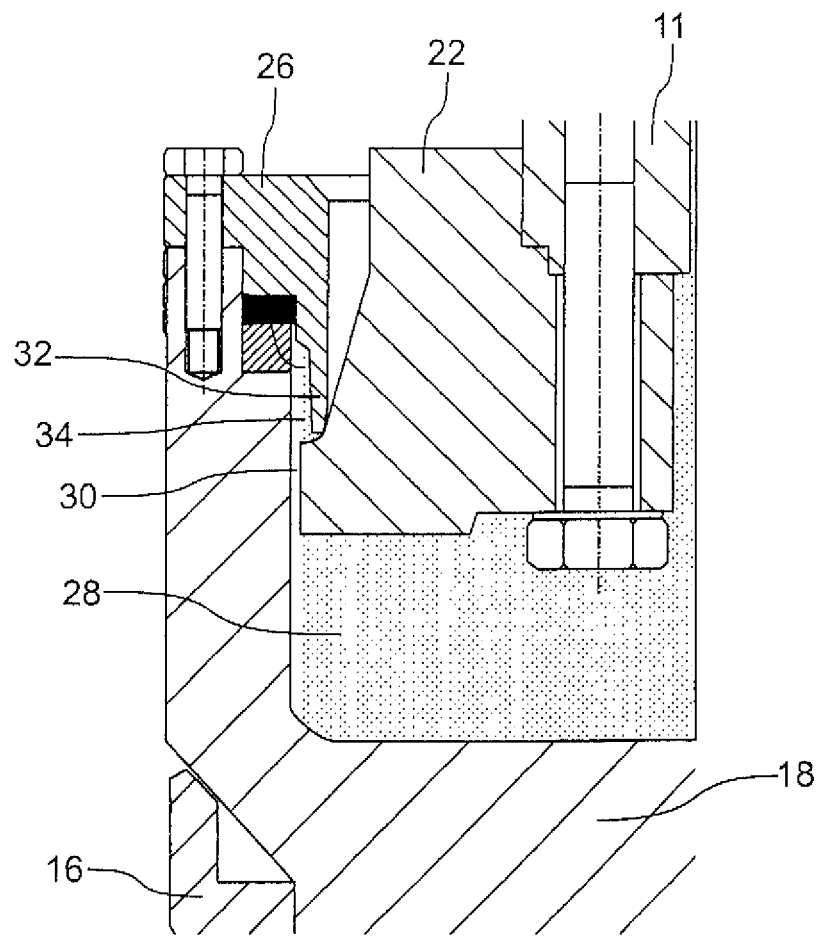

The cooperation of the seat ring 26 mounted on the flow restrictor 18 with the wall 18 of the flow restrictor as well as the closure 22 of the valve housing side is illustrated in more detail in FIG. 2.

FIG. 2 is a view of a detail of the valve 10 of FIG. 1. This view particularly illustrates how the pressure-relieving chamber 28 is sealed with respect to the outlet side 14 of the valve 10 in its closed position. What is illustrated especially clearly in this view is that a gap 30 is formed between the cylindrical flow restrictor wall 18 and the conical chamber closure 22 which is connected to the valve housing 11 via a screw 36.

Flowing through this gap 30 is basically a fluid contained in the pressure-relieving chamber 28. However, such flow will be prevented when the seat ring 26 rests on the conical chamber closure 22 in a closed position of the flow restrictor 18.

What should especially be noted here is that the seat ring 26 includes a ring portion 32 with an abutment edge which will ensure that the seat ring 26 and the conical chamber closure 22 will not only rest tightly the one upon the other in the axial direction in a sealing manner, but that a sealing effect will also be obtained in a radial direction with respect to the conical chamber closure 22 due to a spring effect. This radial sealing effect allows manufacturing tolerances to be compensated in a better way. This is accomplished by the ring portion 32 having resilient ends.

Owing to the seat ring 26 which is screwed onto the flow restrictor 18, during axial movement in the direction of the valve seat 16, the seat ring 26, in particular its resilient ring portion 32, will be capable of sliding along the conical lateral surface of the closure 22 on the valve housing side. If, by contrast, the flow restrictor 18 moves in an axial direction away from the valve seat 16, this will unblock the passage via the gap 30 to the outlet side of the valve. Thus the fluid to be controlled will not only still flow through the valve seat 16 on its way from the inlet side 12 to the outlet side 14 but also via the pressure-relieving chamber 28, through the flow restrictor 18 as it were, to the outlet side 14.

The actuating device according to the invention thus allows almost wear-free and low-power operation of pressure-relieved valves.

LIST OF REFERENCE SIGNS

10 valve
11 valve housing
12 inlet side
14 outlet side
15 valve top
16 valve seat
18 flow restrictor
20 valve rod
22 closure
24 passage
26 seat ring 28 pressure-relieving chamber
30 gap
32 ring portion
36 screw

The invention claimed is:

1. A valve in combination with an actuator controlling fluid flow through said valve, comprising:
   a valve housing (11), a flow restrictor (18) and a valve seat (16);
   said valve housing includes an inlet and an outlet;
   said flow restrictor (18) includes a base portion and a cylindrical portion extending from said base portion, said flow restrictor includes an interior and an exterior;
   a closure (22);
   said closure (22) affixed to said valve housing (11), said valve housing being stationary;
   a pressure-relieving chamber (28) formed by said flow restrictor (18) and said closure (22);
   said flow restrictor (18) movable with respect to said closure (22) between a closed position wherein said flow restrictor engages said valve seat (16) and an open position wherein said flow restrictor is spaced apart from said valve seat and said flow restrictor does not engage said valve seat (16);
   said flow restrictor (18) includes a passageway (24) through said base portion extending from said exterior of said flow restrictor to said interior of said flow restrictor, said passageway (24) communicates with said pressure-relieving chamber (28) and said inlet of said valve housing;
   a seat ring (26);
   said seat ring (26) affixed to said flow restrictor and movable therewith;
   said seat ring (26) engaging and sealing against said closure (22) when said flow restrictor (18) is in said closed position and said flow restrictor engages said valve seat (16); and,
   said seat ring (16) spaced apart from said closure (22) forming a gap (3) therebetween allowing a defined flow from said pressure-relieving chamber (28) to said outlet (14) of said valve when said flow restrictor is in said open position spaced apart from said valve seat and said flow restrictor does not engage said valve seat.

2. The actuator of claim 1 wherein said seat ring (26) circumferentially encompasses said chamber closure (22) and engages said chamber closure when said flow restrictor is in said closed position.

3. The actuator of claim 2 wherein said seat ring (26) includes a resilient sealing edge (32).

4. The actuator of claim 1 wherein said gap (30) between said seat ring (16) and said closure (22) is an annular gap (30).

5. The actuator of claim 4 wherein the flow through gap (30) and passageway (24) is smaller than the maximum adjustment ratio, less than 2% of the maximum flow rate when said flow restrictor is in said open position.

6. The actuator of claim 5 wherein said seat ring (26) includes a resilient sealing edge (32).

7. The actuator of claim 4 wherein said seat ring (26) includes a resilient sealing edge (32).

8. The actuator of claim 1 wherein the flow through gap (30) and passageway (24) is smaller than the maximum adjustment ratio, less than 2% of the maximum flow rate when said flow restrictor is in said open position.

9. The actuator of claim 8 wherein said seat ring (26) includes a resilient sealing edge (32).

10. The actuator of claim 1 wherein said chamber closure (22) includes a conically shaped portion.

11. The actuator of claim 10 wherein said seat ring (26) includes a resilient sealing edge (32).

12. The actuator of claim 1 wherein said seat ring (26) includes a resilient sealing edge (32).

* * * * *

UNITED STATES PATENT AND TRADEMARK OFFICE
CERTIFICATE OF CORRECTION

| | | |
|---|---|---|
| PATENT NO. | : 8,505,578 B2 | Page 1 of 1 |
| APPLICATION NO. | : 13/160480 | |
| DATED | : August 13, 2013 | |
| INVENTOR(S) | : Nebel | |

It is certified that error appears in the above-identified patent and that said Letters Patent is hereby corrected as shown below:

In the Specification

Col. 2, line 60, after "circular in cross-section" delete ", in" and insert -- . In --.

Signed and Sealed this
Fifth Day of November, 2013

Teresa Stanek Rea
*Deputy Director of the United States Patent and Trademark Office*